(12) United States Patent
Evans

(10) Patent No.: US 7,191,175 B2
(45) Date of Patent: Mar. 13, 2007

(54) SYSTEM AND METHOD FOR ARRANGING CONCEPT CLUSTERS IN THEMATIC NEIGHBORHOOD RELATIONSHIPS IN A TWO-DIMENSIONAL VISUAL DISPLAY SPACE

(75) Inventor: Lynne Marie Evans, Renton, WA (US)

(73) Assignee: Attenex Corporation, Seattle, WA (US)

( * ) Notice: Subject to any disclaimer, the term of this patent is extended or adjusted under 35 U.S.C. 154(b) by 482 days.

(21) Appl. No.: 10/778,416

(22) Filed: Feb. 13, 2004

(65) Prior Publication Data

US 2005/0182764 A1 Aug. 18, 2005

(51) Int. Cl.
*G06F 17/30* (2006.01)
(52) U.S. Cl. .......................................... 707/5
(58) Field of Classification Search .................. 707/1, 707/2, 6, 10, 200, 5; 345/440
See application file for complete search history.

(56) References Cited

U.S. PATENT DOCUMENTS

| | | | |
|---|---|---|---|
| 5,056,021 | A | 10/1991 | Ausborn |
| 5,488,725 | A | 1/1996 | Turtle et al. |
| 6,173,275 | B1 | 1/2001 | Caid et al. |
| 6,446,061 | B1 | 9/2002 | Doerre et al. |
| 6,510,406 | B1 | 1/2003 | Marchisio |
| 6,560,597 | B1 | 5/2003 | Dhillon et al. |
| 6,675,159 | B1 | 1/2004 | Lin et al. |
| 6,701,305 | B1 | 3/2004 | Holt et al. |
| 6,711,585 | B1 | 3/2004 | Copperman et al. |
| 6,888,548 | B1 * | 5/2005 | Gallivan ............... 345/440 |
| 2005/0171948 | A1 * | 8/2005 | Knight ..................... 707/6 |

OTHER PUBLICATIONS

Christina Yip Chung et al, "Thematic Mapping—From Unstructured Documents To Taxonomies," CIKM'02, Nov. 4-9, 2002, pp. 608-610, ACM, McLean, Virginia, USA.
Hiroyuki Kawano, "Overview of Mondou Web Search Engine Using Text Mining And Information Visualizing Technologies," IEEE, 2001, pp. 234-241.
James Osborn et al "JUSTICE: A Judicial Search Tool Using Intelligent Concept Extraction," ICAIL-99, 1999, pp. 173-181, ACM.
Chen An et al "Fuzzy Concept Graph And Application In Web Document Clustering," 2001, pp. 101-106, IEEE.
Robert E. Horn "Visual Language: Global Communication for the 21st Century," 1998, pp. 51-92, Bainbridge, Washington, USA.

* cited by examiner

*Primary Examiner*—Etienne P LeRoux
(74) *Attorney, Agent, or Firm*—Patrick J. S. Inouye; Krista A. Wittman

(57) ABSTRACT

A system and method for arranging concept clusters in thematic neighborhood relationships in a two-dimensional visual display space is presented. A set of clusters is selected from a concept space. The concept space includes a multiplicity of clusters with concepts visualizing document content based on extracted concepts. A theme in each of a plurality of the clusters is identified. Each theme includes at least one such concept ranked within the cluster. A plurality of unique candidate spines is logically formed. Each candidate spine includes clusters commonly sharing at least one such concept. The clusters are assigned to one such candidate spine having a substantially best fit. Each such sufficiently unique best fit candidate spine is identified and placed in a visual display space. Each non-identified best fit candidate spine is placed in the visual display space relative to an anchor cluster on one such identified best fit candidate spine.

38 Claims, 16 Drawing Sheets

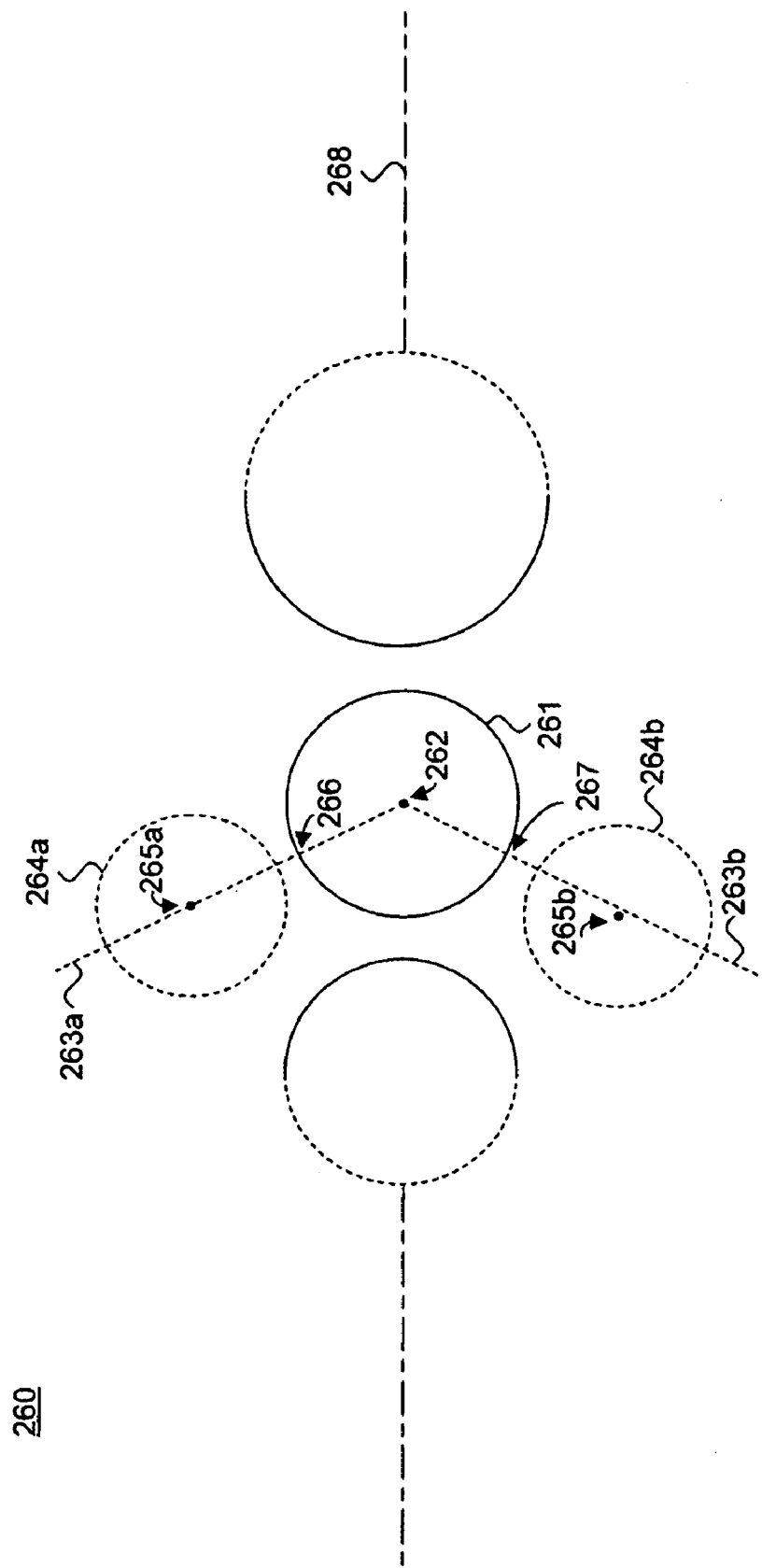

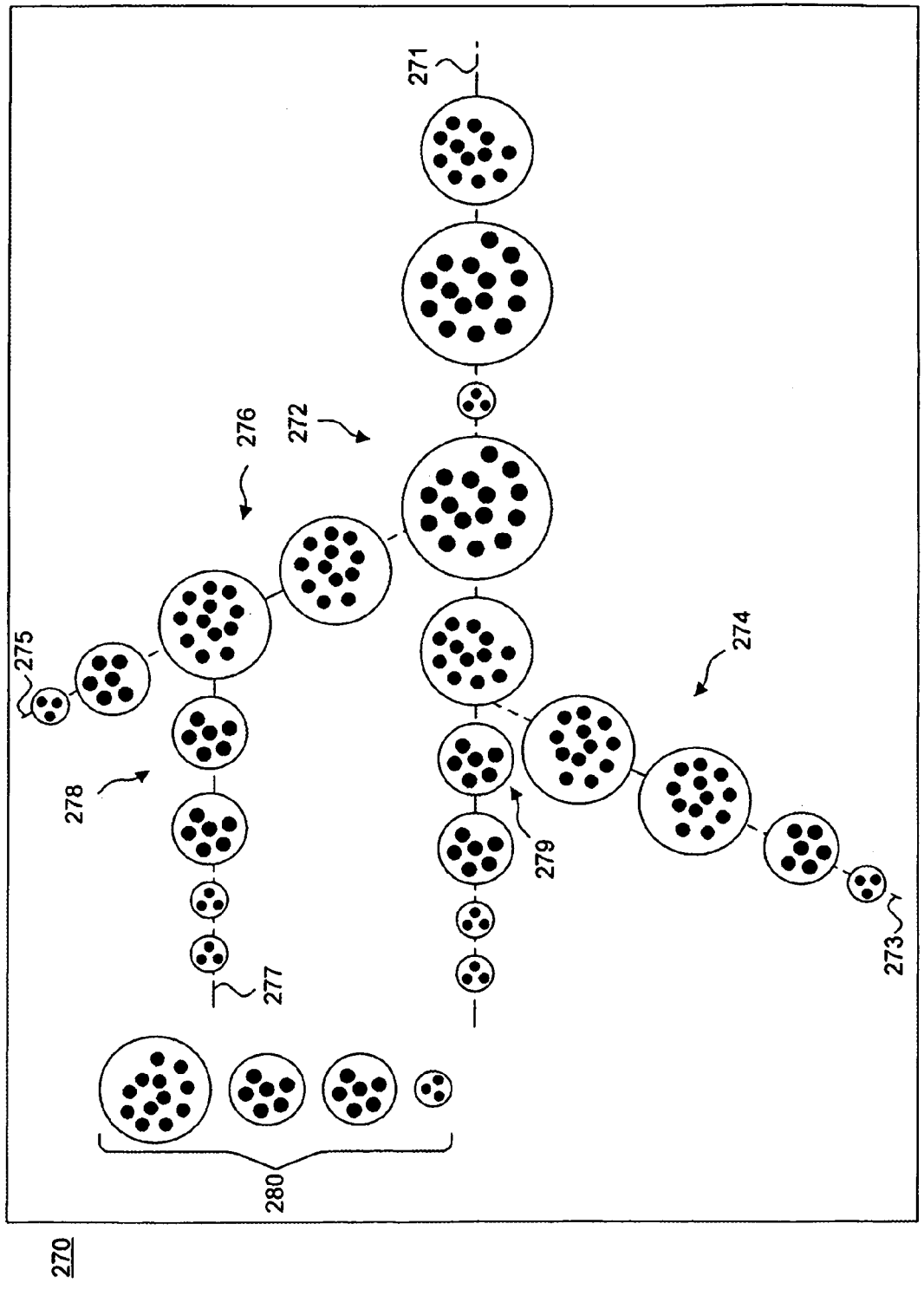

SYSTEM AND METHOD FOR ARRANGING CONCEPT CLUSTERS IN THEMATIC NEIGHBORHOOD RELATIONSHIPS IN A TWO-DIMENSIONAL VISUAL DISPLAY SPACE

FIELD OF THE INVENTION

The present invention relates in general to data visualization and, in particular, to a system and method for arranging concept clusters in thematic neighborhood relationships in a two-dimensional visual display space.

BACKGROUND OF THE INVENTION

In general, data visualization transforms numeric or textual information into a graphical display format to assist users in understanding underlying trends and principles in the data. Effective data visualization complements and, in some instances, supplants numbers and text as a more intuitive visual presentation format than raw numbers or text alone. However, graphical data visualization is constrained by the physical limits of computer display systems. Two-dimensional and three-dimensional visualized information can be readily displayed. However, visualized information in excess of three dimensions must be artificially compressed if displayed on conventional display devices. Careful use of color, shape and temporal attributes can simulate multiple dimensions, but comprehension and usability become difficult as additional layers of modeling are artificially grafted into a two- or three-dimensional display space.

Mapping multi-dimensional information into a two- or three-dimensional display space potentially presents several problems. For instance, a viewer could misinterpret dependent relationships between discrete objects displayed adjacently in a two or three dimensional display. Similarly, a viewer could erroneously interpret dependent variables as independent and independent variables as dependent. This type of problem occurs, for example, when visualizing clustered data, which presents discrete groupings of related data. Other factors further complicate the interpretation and perception of visualized data, based on the Gestalt principles of proximity, similarity, closed region, connectedness, good continuation, and closure, such as described in R. E. Horn, "Visual Language: Global Communication for the 21$^{st}$ Century," Ch. 3, MacroVU Press (1998), the disclosure of which is incorporated by reference.

Conventionally, objects, such as clusters, modeled in multi-dimensional concept space are generally displayed in two- or three-dimensional display space as geometric objects. Independent variables are modeled through object attributes, such as radius, volume, angle, distance and so forth. Dependent variables are modeled within the two or three dimensions. However, poor cluster placement within the two or three dimensions can mislead a viewer into misinterpreting dependent relationships between discrete objects.

Consider, for example, a group of clusters, which each contain a group of points corresponding to objects sharing a common set of traits. Each cluster is located at some distance from a common origin along a vector measured at a fixed angle from a common axis. The radius of each cluster reflects the number of objects contained. Clusters located along the same vector are similar in traits to those clusters located on vectors separated by a small cosine rotation. However, the radius and distance of each cluster from the common origin are independent variables relative to other clusters. When displayed in two dimensions, the overlaying or overlapping of clusters could mislead the viewer into perceiving data dependencies between the clusters where no such data dependencies exist.

Conversely, multi-dimensional information can be advantageously mapped into a two- or three-dimensional display space to assist with comprehension based on spatial appearances. Consider, as a further example, a group of clusters, which again each contain a group of points corresponding to objects sharing a common set of traits and in which one or more "popular" concepts or traits frequently appear in some of the clusters. Since the distance of each cluster from the common origin is an independent variable relative to other clusters, those clusters that contain popular concepts or traits may be placed in widely separated regions of the display space and could similarly mislead the viewer into perceiving no data dependencies between the clusters where such data dependencies exist.

One approach to depicting thematic relationships between individual clusters applies a force-directed or "spring" algorithm. Clusters are treated as bodies in a virtual physical system. Each body has physics-based forces acting on or between them, such as magnetic repulsion or gravitational attraction. The forces on each body are computed in discrete time steps and the positions of the bodies are updated. However, the methodology exhibits a computational complexity of order $O(n^2)$ per discrete time step and scales poorly to cluster formations having a few hundred nodes. Moreover, large groupings of clusters tend to pack densely within the display space, thereby losing any meaning assigned to the proximity of related clusters.

Therefore, there is a need for an approach to efficiently placing clusters based on popular concepts or traits into thematic neighborhoods that map multiple cluster relationships in a visual display space.

There is a further need for an approach to orienting data clusters to properly visualize independent and dependent variables while compressing thematic relationships to emphasize thematically stronger relationships.

SUMMARY OF THE INVENTION

Relationships between concept clusters are shown in a two-dimensional display space by combining connectedness and proximity. Clusters sharing "popular" concepts are identified by evaluating thematically-closest neighboring clusters, which are assigned into linear cluster spines arranged to avoid object overlap. The cluster arrangement methodology exhibits a highly-scalable computational complexity of order $O(n)$.

An embodiment provides a system and method for arranging concept clusters in thematic neighborhood relationships in a two-dimensional visual display space. A set of clusters is selected from a concept space. The concept space includes a multiplicity of clusters with concepts visualizing document content based on extracted concepts. A theme in each of a plurality of the clusters is identified. Each theme includes at least one such concept ranked within the cluster. A plurality of unique candidate spines is logically formed. Each candidate spine includes clusters commonly sharing at least one such concept. One or more of the clusters are assigned to one such candidate spine having a substantially best fit. Each such best fit candidate spine sufficiently unique from each other such best fit candidate spine is identified. The identified best fit candidate spine is placed in a visual display space. Each non-identified best fit candidate spine is placed in the visual display space relative to an anchor cluster on one such identified best fit candidate spine.

Still other embodiments of the present invention will become readily apparent to those skilled in the art from the following detailed description, wherein are one embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 13 is a data representation diagram showing cluster placement relative to an anchor point.

FIG. 14 is a data representation diagram showing a completed cluster placement.

DETAILED DESCRIPTION

Glossary

Concept: One or more preferably root stem normalized words defining a specific meaning.
Theme: One or more concepts defining a semantic meaning.
Cluster: Grouping of documents containing one or more common themes.
Spine: Grouping of clusters sharing a single concept preferably arranged linearly along a vector. Also referred to as a cluster spine.
Spine Group: Set of connected and semantically-related spines.

The foregoing terms are used throughout this document and, unless indicated otherwise, are assigned the meanings presented above.

System Overview

Figure 1:
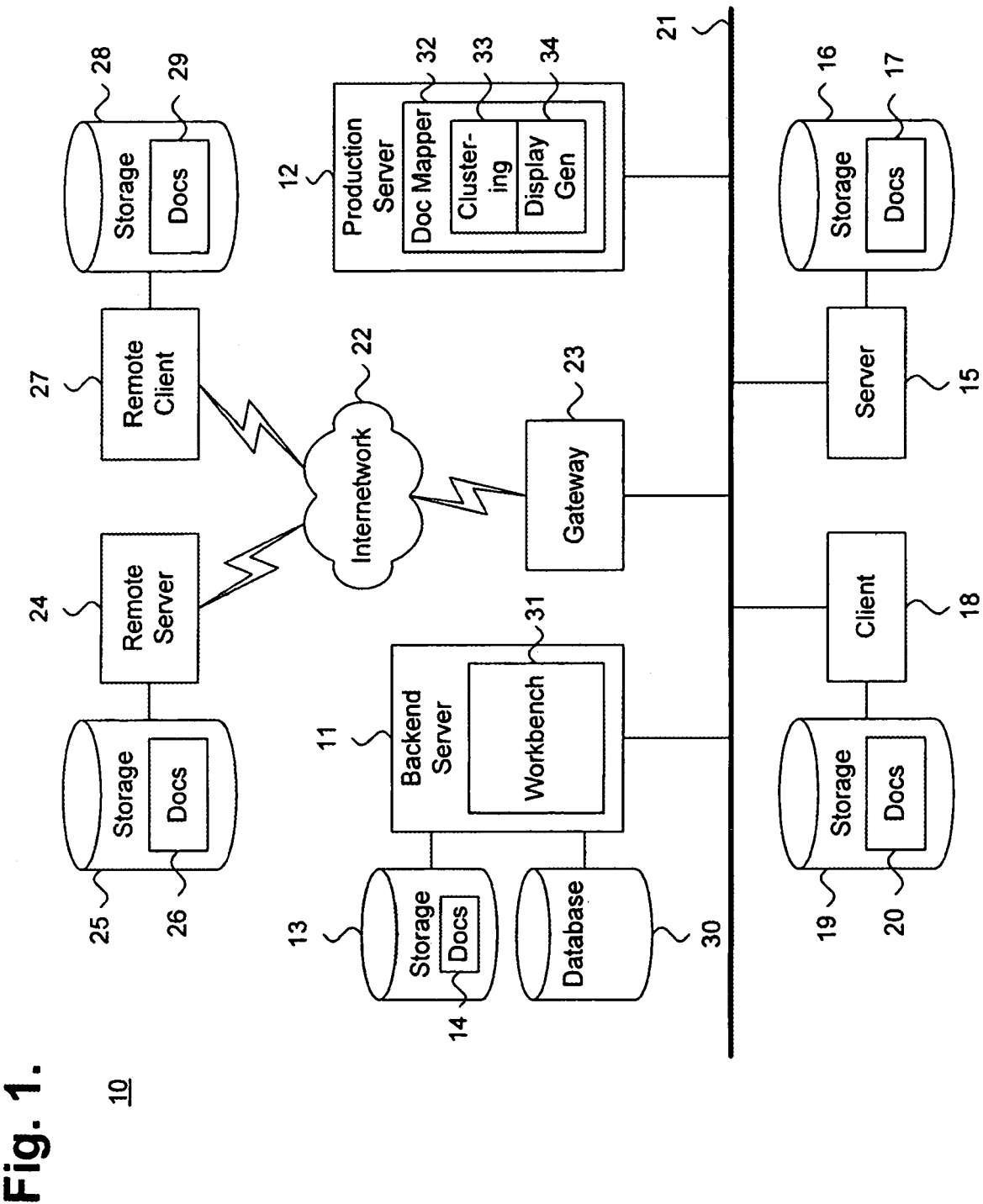
FIG. 1 is a block diagram showing a system for arranging concept clusters in thematic neighborhood relationships in a two-dimensional visual display space, in accordance with the present invention.

FIG. 1 is a block diagram showing a system 10 for arranging concept clusters in thematic neighborhood relationships in a two-dimensional visual display space, in accordance with the present invention. By way of illustration, the system 10 operates in a distributed computing environment, which includes a plurality of heterogeneous systems and document sources. A backend server 11 executes a workbench suite 31 for providing a user interface framework for automated document management, processing and analysis. The backend server 11 is coupled to a storage device 13, which stores documents 14, in the form of structured or unstructured data, and a database 30 for maintaining document information. A production server 12 includes a document mapper 32, that includes a clustering engine 33 and display generator 34. The clustering engine 33 performs efficient document scoring and clustering, such as described in commonly-assigned U.S. patent application Ser. No. 10/626,984, filed Jul. 25, 2003, pending, the disclosure of which is incorporated by reference. The display generator 34 arranges concept clusters in thematic neighborhood relationships in a two-dimensional visual display space, as further described below beginning with reference to FIG. 2.

The document mapper 32 operates on documents retrieved from a plurality of local sources. The local sources include documents 17 maintained in a storage device 16 coupled to a local server 15 and documents 20 maintained in a storage device 19 coupled to a local client 18. The local server 15 and local client 18 are interconnected to the production system 11 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27.

The individual documents 17, 20, 26, 29 include all forms and types of structured and unstructured data, including electronic message stores, such as word processing documents, electronic mail (email) folders, Web pages, and graphical or multimedia data. Notwithstanding, the documents could be in the form of organized data, such as stored in a spreadsheet or database.

In one embodiment, the individual documents 17, 20, 26, 29 include electronic message folders, such as maintained by the Outlook and Outlook Express products, licensed by Microsoft Corporation, Redmond, Wash. The database is an SQL-based relational database, such as the Oracle database management system, release 8, licensed by Oracle Corporation, Redwood Shores, Calif.

The individual computer systems, including backend server 11, production server 32, server 15, client 18, remote server 24 and remote client 27, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Display Generator

Figure 2:
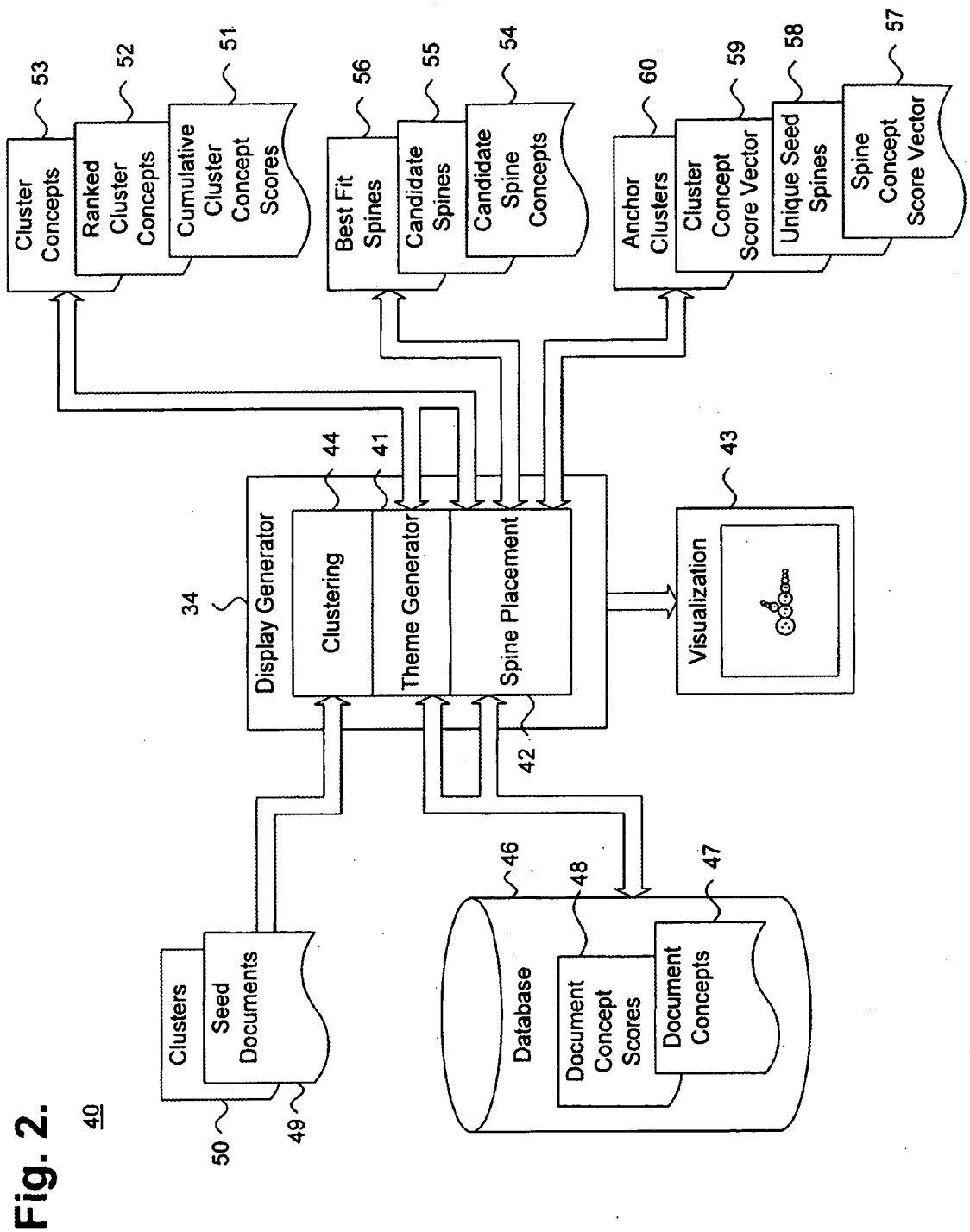
FIG. 2 is a block diagram showing the system modules implementing the display generator of FIG. 1.

FIG. 2 is a block diagram showing the system modules implementing the display generator 34 of FIG. 1. The display generator 34 includes clustering 44, theme generator 41 and spine placement 42 components and maintains attached storage (not shown) and database 46. Individual documents 14 are analyzed by the clustering component 44 to form clusters 50 of semantically scored documents, such as described in commonly-assigned U.S. patent application Ser. No. 10/626,984, filed Jul. 25, 2003, pending, the disclosure of which is incorporated by reference. In one embodiment, document concepts 47 are formed from concepts and terms extracted from the documents 14 and the frequencies of occurrences and reference counts of the concepts and terms are determined. Each concept and term is then scored based on frequency, concept weight, structural weight, and corpus weight. The document concept scores 48 are compressed and assigned to normalized score vectors for each of the documents 14. The similarities between each of the normalized score vectors are determined, preferably as cosine values. A set of candidate seed documents is evaluated to select a set of seed documents 49 as initial cluster centers based on relative similarity between the assigned normalized score vectors for each of the candidate seed documents or using a dynamic threshold based on an analysis of the similarities of the documents 14 from a center of each cluster 15, such as described in commonly-assigned U.S. patent application Ser. No. 10/626,984, filed Jul. 25, 2003, pending, the disclosure of which is incorporated by reference. The remaining non-seed documents are evaluated against the cluster centers also based on relative similarity and are grouped into the clusters 50 based on best-fit, subject to a minimum fit criterion.

The theme generator 41 evaluates the document concepts 47 assigned to each of the clusters 50 and identifies cluster concepts 53 for each cluster 50, as further described below with reference to FIG. 4. Briefly, the document concepts 47 for each cluster 50 are ranked into ranked cluster concepts 52 based on cumulative document concept scores 51. The top-ranked document concepts 47 are designated as cluster concepts 53. In the described embodiment, each cluster concept 53 must also be a document concept 47 appearing in the initial cluster center, be contained in a minimum of two documents 14 or at least 30% of the documents 14 in the cluster 50. Other cluster concept membership criteria are possible.

The cluster placement component 42 places spines and certain clusters 50 into a two-dimensional display space as a visualization 43. The cluster placement component 42 performs four principal functions. First, the cluster placement component 42 selects candidate spines 55, as further described below with reference to FIG. 5. Briefly, the candidate spines 55 are selected by surveying the cluster concepts 53 for each cluster 50. Each cluster concept 53 shared by two or more clusters 50 can potentially form a spine of clusters 50. However, those cluster concepts 53 referenced by just a single cluster 50 or by more than 10% of the clusters 50 are discarded. The remaining clusters 50 are identified as candidate spine concepts 54, which each logically form a candidate spine 55.

Second, the cluster placement component 42 assigns each of the clusters 50 to a best fit spine 56, as further described below with reference to FIG. 6. Briefly, the fit of each candidate spine 55 to a cluster 50 is determined by evaluating the candidate spine concept 54 to the cluster concept 53. The candidate spine 55 exhibiting a maximum fit is selected as the best fit spine 56 for the cluster 50.

Third, the cluster placement component 42 selects and places unique seed spines 58, as further described below with reference to FIG. 7. Briefly, spine concept score vectors 57 are generated for each best fit spine 56 and evaluated. Those best fit spines 56 having an adequate number of assigned clusters 50 and which are sufficiently dissimilar to any previously selected best fit spines 56 are designated and placed as seed spines 58.

The cluster placement component 42 places any remaining unplaced best fit spines 56 and clusters 50 that lack best fit spines 56 into spine groups, as further described below with reference to FIG. 8. Briefly, anchor clusters 60 are selected based on similarities between unplaced candidate spines 55 and candidate anchor clusters. Cluster spines are grown by placing the clusters 50 in similarity precedence to previously placed spine clusters or anchor clusters along vectors originating at each anchor cluster 60. As necessary, clusters 50 are placed outward or in a new vector at a different angle from new anchor clusters 55. Finally, the spine groups are placed within the visualization 43 by translating the spine groups until there is no overlap, such as described in commonly-assigned U.S. patent application Ser. No. 10/084,401, filed Feb. 25, 2002, pending, the disclosure of which is incorporated by reference.

Each module or component is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The display generator 32 operates in accordance with a sequence of process steps, as further described below with reference to FIG. 3.

Method Overview

Figure 3:
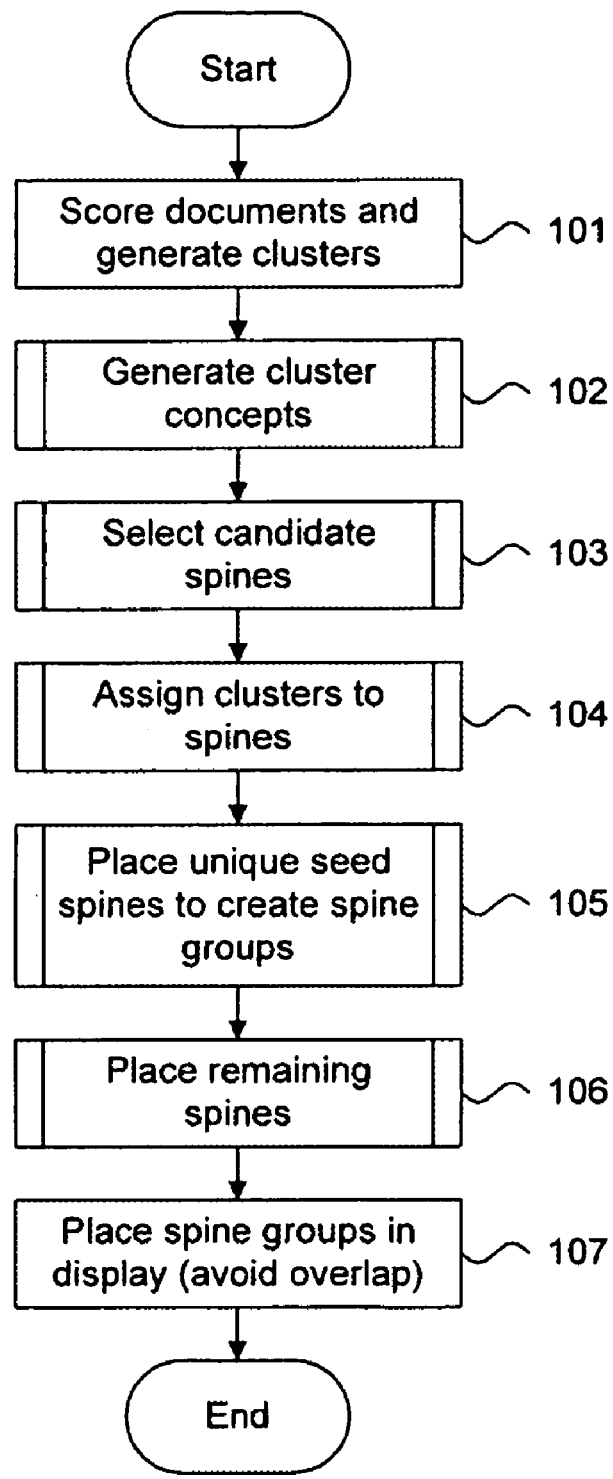
FIG. 3 is a flow diagram showing a method for arranging concept clusters in thematic neighborhood relationships in a two-dimensional visual display space, in accordance with the present invention.

FIG. 3 is a flow diagram showing a method 100 for arranging concept clusters 50 in thematic neighborhood relationships in a two-dimensional visual display space, in accordance with the present invention. The method 100 is described as a sequence of process operations or steps, which can be executed, for instance, by a display generator 32 (shown in FIG. 1).

As an initial step, documents 14 are scored and clusters 50 are generated (block 101), such as described in commonly-assigned U.S. patent application Ser. No. 10/626,984, filed Jul. 25, 2003, pending, the disclosure of which is incorporated by reference. Next, one or more cluster concepts 53 are generated for each cluster 50 based on cumulative cluster concept scores 51 (block 102), as further described below with reference to FIG. 4. The cluster concepts 53 are used to select candidate spines 55 (block 103), as further described below with reference to FIG. 5, and the clusters 50 are then assigned to the candidate spines 55 as best fit spines 56 (block 104), as further described below with reference to FIG. 6. Unique seed spines are identified from the best fit spines 56 and placed to create spine groups (block 105), along with any remaining unplaced best fit spines 56 and clusters 50 that lack best fit spines 56 (block 106), as further described below with reference to FIG. 8. Finally, the spine groups are placed within the visualization 43 in the display space. In the described embodiment, each of the spine groups is placed so as to avoid overlap with other spine groups. In a further embodiment, the spine groups can be placed by similarity to other spine groups. Other cluster, spine, and spine group placement methodologies could also be applied based on similarity, dissimilarity, attraction, repulsion, and other properties in various combinations, as would be appreciated by one skilled in the art. The method then terminates.

Cluster Concept Generation

Figure 4:
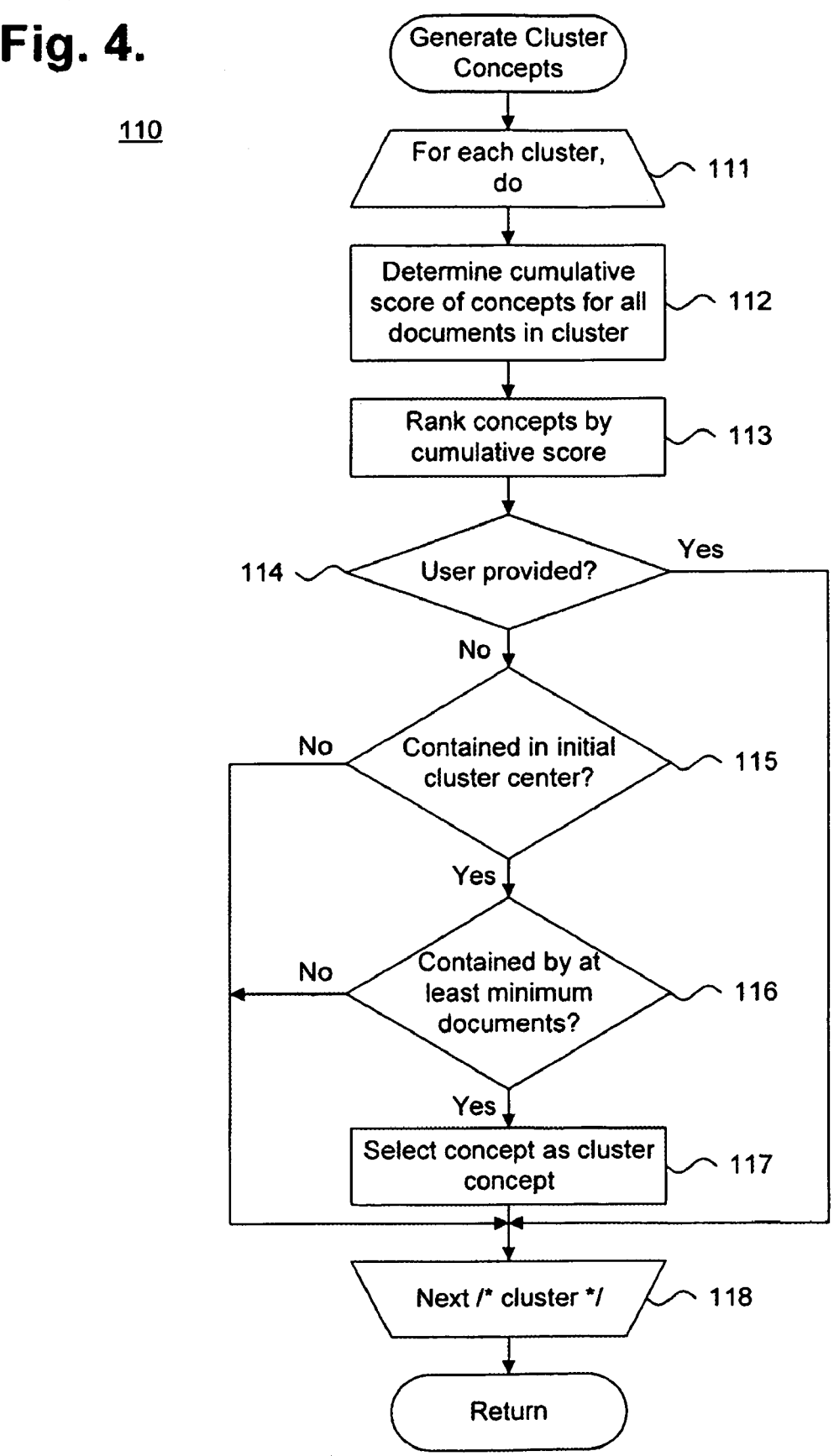
FIG. 4 is a flow diagram showing the routine for generating cluster concepts for use in the method of FIG. 3.

FIG. 4 is a flow diagram showing the routine 110 for generating cluster concepts 53 for use in the method 100 of FIG. 3. One purpose of this routine is to identify the top ranked cluster concepts 53 that best summarizes the commonality of the documents in any given cluster 50 based on cumulative document concept scores 51.

A cluster concept 53 is identified by iteratively processing through each of the clusters 50 (blocks 111–118). During each iteration, the cumulative score 51 of each of the document concepts 47 for all of the documents 14 appearing in a cluster 50 are determined (block 112). The cumulative score 51 can be calculated by summing over the document concept scores 48 for each cluster 50. The document concepts 47 are then ranked by cumulative score 51 as ranked cluster concepts 52 (block 113). In the described embodiment, the ranked cluster concepts 52 appear in descending order, but could alternatively be in ascending order. Next, a cluster concept 53 is determined. The cluster concept 53 can be user provided (block 114). Alternatively, each ranked cluster concept 52 can be evaluated against an acceptance criteria (blocks 115 and 116) to select a cluster concept 53. In the described embodiment, cluster concepts 53 must meet the following criteria:

(1) be contained in the initial cluster center (block 115); and
(2) be contained in a minimum of two documents 14 or 30% of the documents 14 in the cluster 50, whichever is greater (block 116).

The first criteria restricts acceptable ranked cluster concepts 52 to only those document concepts 47 that appear in a seed cluster center theme of a cluster 50 and, by implication, are sufficiently relevant based on their score vectors. Generally, a cluster seed theme corresponds to the set of concepts appearing in a seed document 49, but a cluster seed theme can also be specified by a user or by using a dynamic threshold based on an analysis of the similarities of the documents 14 from a center of each cluster 50, such as described in commonly-assigned U.S. patent application Ser. No. 10/626,984, filed Jul. 25, 2003, pending, the disclosure of which is incorporated by reference The second criteria filters out those document concepts 47 that are highly scored, yet not popular. Other criteria and thresholds for determining acceptable ranked cluster concepts 52 are possible.

If acceptable (blocks 115 and 116), the ranked cluster concept 52 is selected as a cluster concept 53 (block 117) and processing continues with the next cluster (block 118), after which the routine returns.

Candidate Spine Selection

Figure 5:
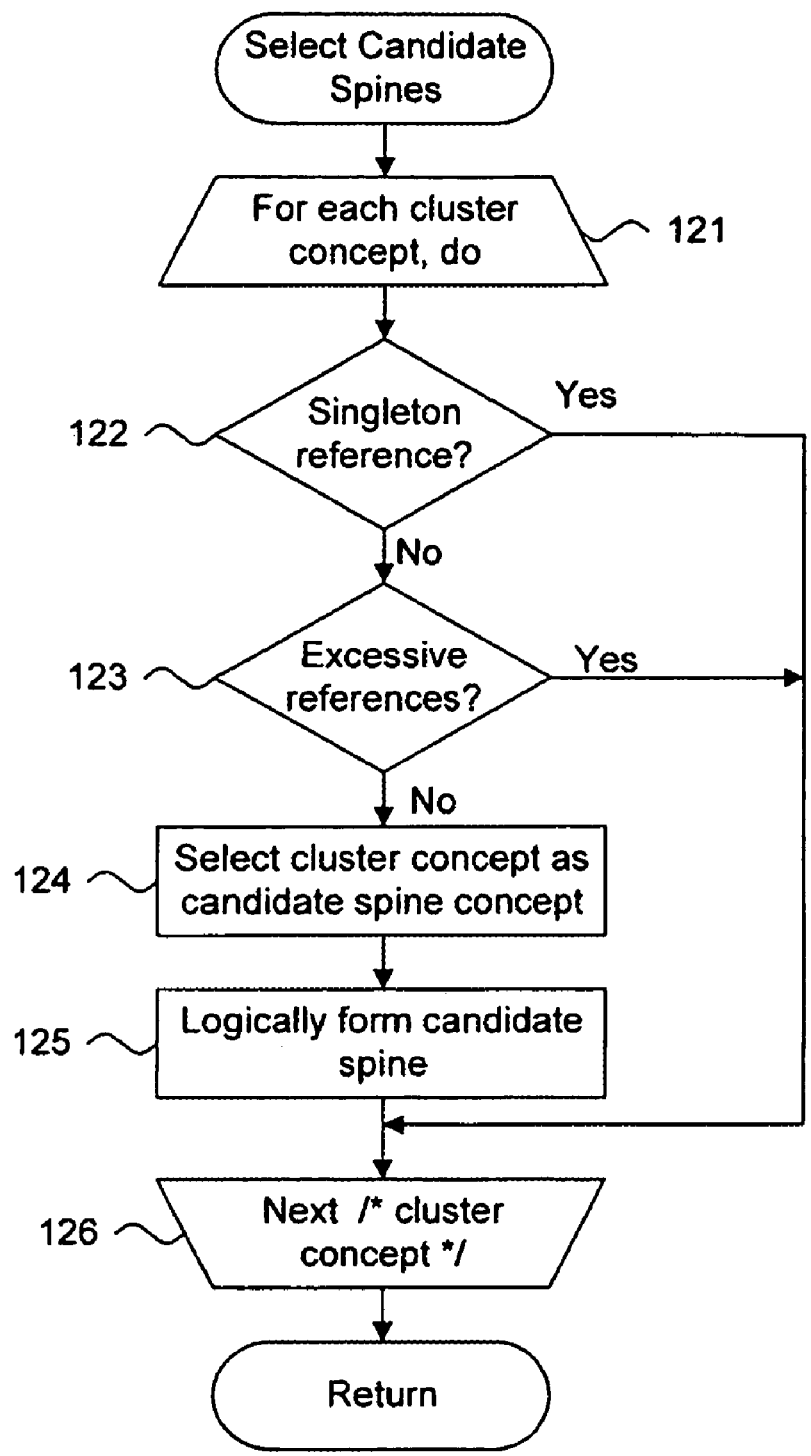
FIG. 5 is a flow diagram showing the routine for selecting candidate spines for use in the method of FIG. 3.

FIG. 5 is a flow diagram showing the routine 120 for selecting candidate spines 55 for use in the method 100 of FIG. 3. One purpose of this routine is to identify candidate spines 55 from the set of all potential spines 55.

Each cluster concept 53 shared by two or more clusters 50 can potentially form a spine of clusters 50. Thus, each cluster concept 53 is iteratively processed (blocks 121–126). During each iteration, each potential spine is evaluated against an acceptance criteria (blocks 122–123). In the described embodiment, a potential spine cannot be referenced by only a single cluster 50 (block 122) or by more than 10% of the clusters 50 in the potential spine (block 123). Other criteria and thresholds for determining acceptable cluster concepts 53 are possible. If acceptable (blocks 122, 123), the cluster concept 53 is selected as a candidate spine concept 54 (block 124) and a candidate spine 55 is logically formed (block 125). Processing continues with the next cluster (block 126), after which the routine returns.

Cluster to Spine Assignment

Figure 6:
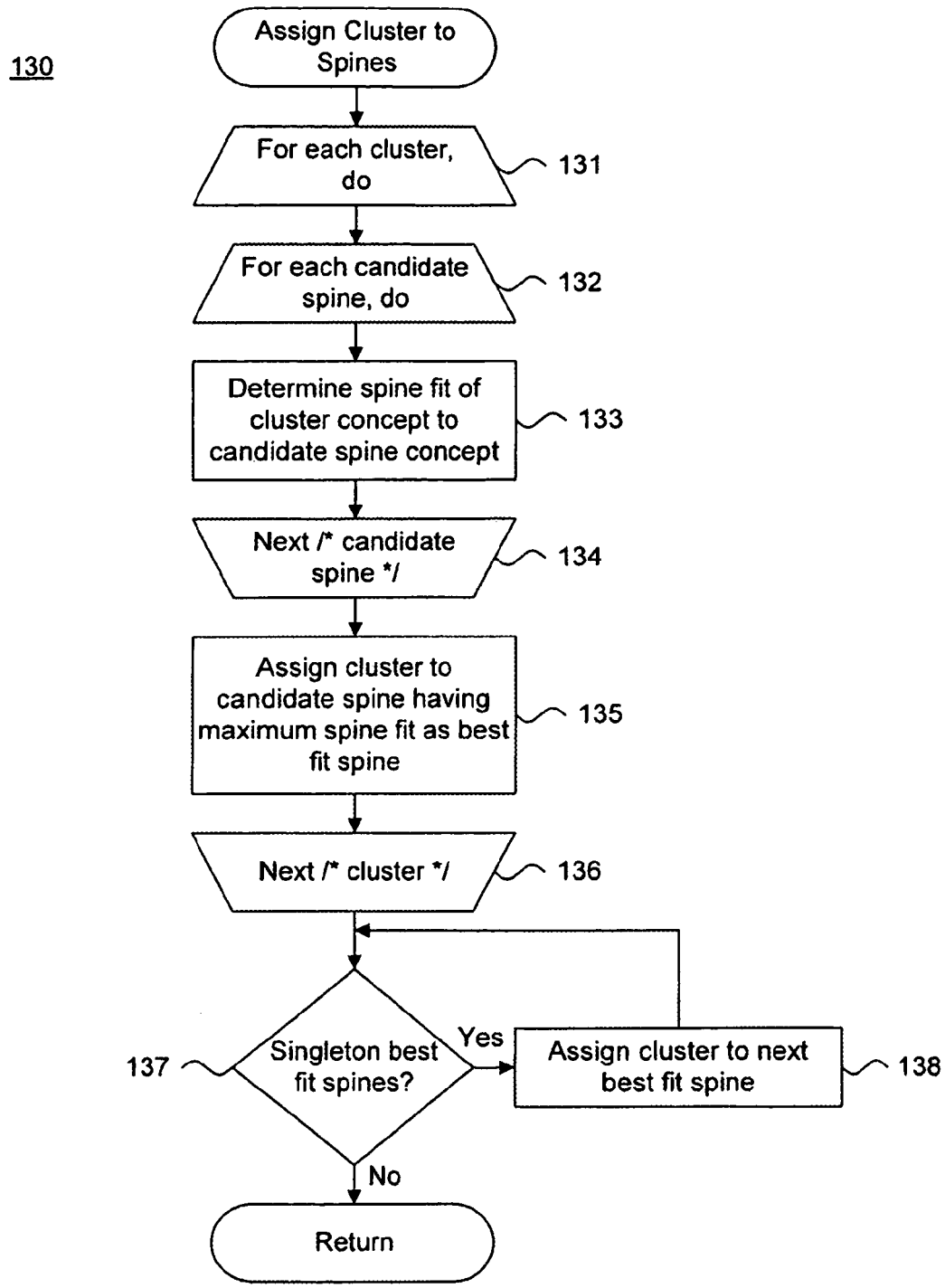
FIG. 6 is a flow diagram showing the routine for assigning clusters to candidate spines for use in the method of FIG. 3.

FIG. 6 is a flow diagram showing the routine 130 for assigning clusters 50 to candidate spines 55 for use in the method 100 of FIG. 3. One purpose of this routine is to match each cluster 50 to a candidate spine 55 as a best fit spine 56.

The best fit spines 56 are evaluated by iteratively processing through each cluster 50 and candidate spine 55 (blocks 131–136 and 132–134, respectively). During each iteration for a given cluster 50 (block 131), the spine fit of a cluster concept 53 to a candidate spine concept 54 is determined (block 133) for a given candidate spine 55 (block 132). In the described embodiment, the spine fit F is calculated according to the following equation:

$$F = \log\left(\frac{popularity}{rank^2}\right) \times scale$$

where popularity is defined as the number of clusters 50 containing the candidate spine concept 54 as a cluster concept 53, rank is defined as the rank of the candidate spine concept 54 for the cluster 50, and scale is defined as a bias factor for favoring a user specified concept or other predefined or dynamically specified characteristic. In the described embodiment, a scale of 1.0 is used for candidate spine concept 54 while a scale of 5.0 is used for user specified concepts. Processing continues with the next candidate spine 55 (block 134). Next, the cluster 50 is assigned to the candidate spine 55 having a maximum spine fit as a best fit spine 56 (block 135). Processing continues with the next cluster 50 (block 136). Finally, any best fit spine 56 that attracts only a single cluster 50 is discarded (block 137) by assigning the cluster 50 to a next best fit spine 56 (block 138). The routine returns.

Generate Unique Spine Group Seeds

Figure 7:
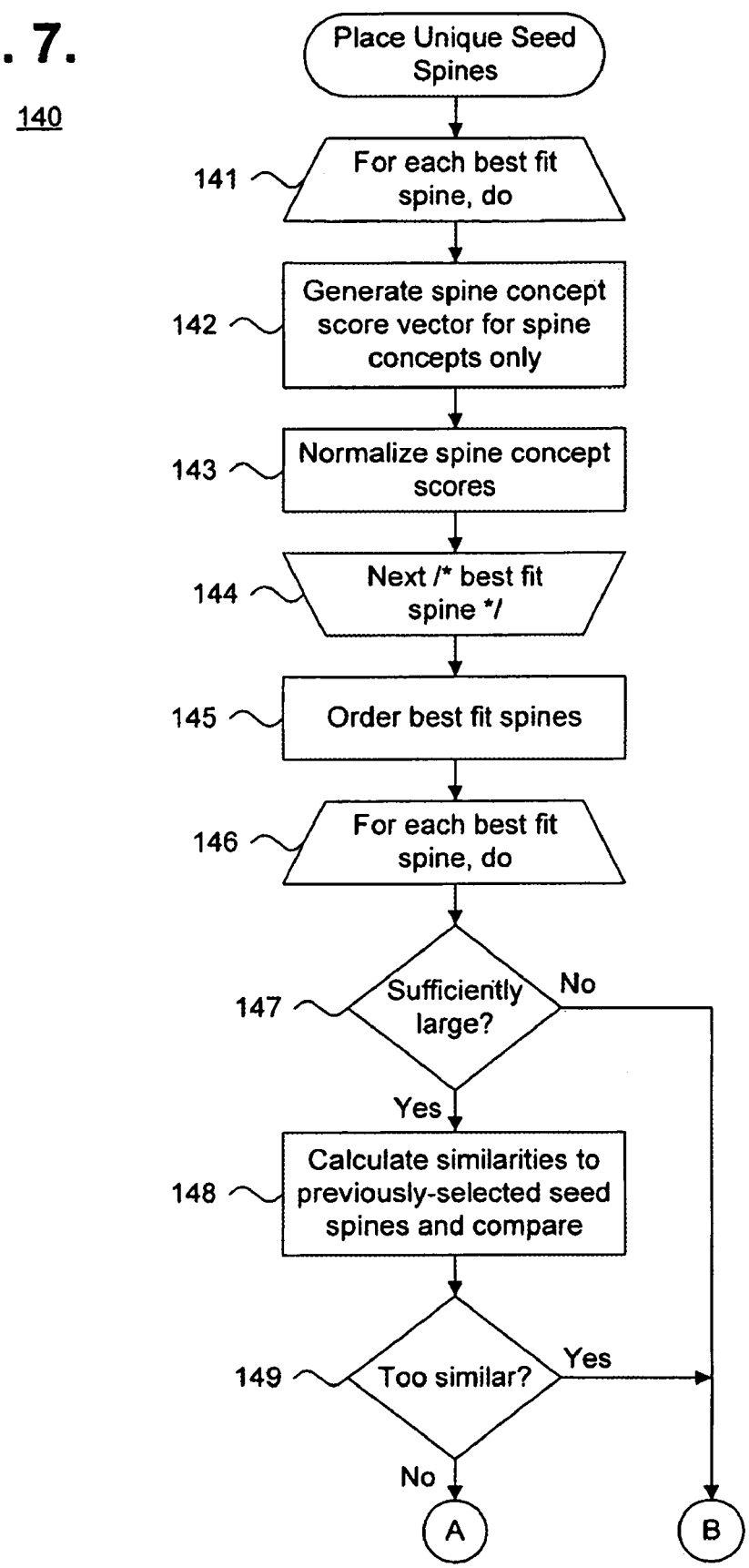
FIG. 7 is a flow diagram showing the routine for placing unique seed spines for use in the method of FIG. 3.
Figure 7:
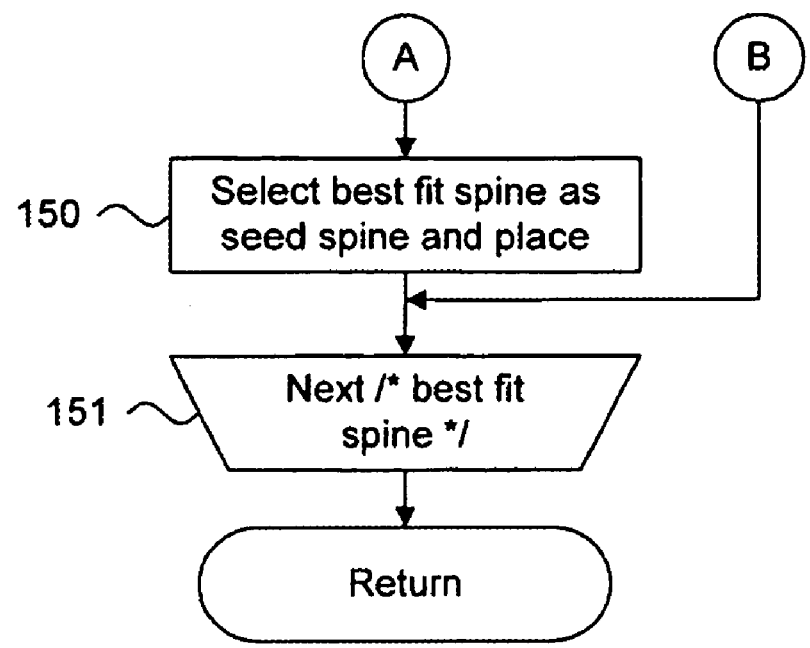

FIG. 7 is a flow diagram showing the routine 140 for placing unique seed spines for use in the method 100 of FIG. 3. One purpose of this routine is to identify and place best fit spines 56 into the visualization 43 as unique seed spines 58 for use as anchors for subsequent candidate spines 55

Candidate unique seed spines are selected by first iteratively processing through each best fit spine 56 (blocks 141–144). During each iteration, a spine concept score vector 57 is generated for only those spine concepts corresponding to each best fit spine 56 (block 142). The spine concept score vector 57 aggregates the cumulative cluster concept scores 51 for each of the clusters 50 in the best fit spine 56. Each spine concept score in the spine concept score vector 57 is normalized, such as by dividing the spine concept score by the length of the spine concept score vector 57 (block 143). Processing continues for each remaining best fit spine 56 (block 144), after which the best fit spines 56 are ordered by number of clusters 50. Each best fit spine 56 is again iteratively processed (blocks 146–151). During each iteration, best fit spines 56 that are not sufficiently large are discarded (block 147). In the described embodiment, a sufficiently large best fit spine 56 contains at least five clusters 50. Next, the similarities of the best fit spine 56 to each previously-selected unique seed spine 58 is calculated and compared (block 148). In the described embodiment, best fit spine similarity is calculated as the cosine of the cluster concept score vectors 59, which contains the cumulative cluster concept scores 51 for the cluster concepts 53 of each cluster 50 in the best fit spine 56 or previously-selected unique seed spine 58. Best fit spines 56 that are not sufficiently dissimilar are discarded (block 14). Otherwise, the best fit spine 56 is identified as a unique seed spine 58 and is placed in the visualization 43 (block 150). Processing continues with the next best fit spine 56 (block 151), after which the routine returns.

Remaining Spine Placement

Figure 8:
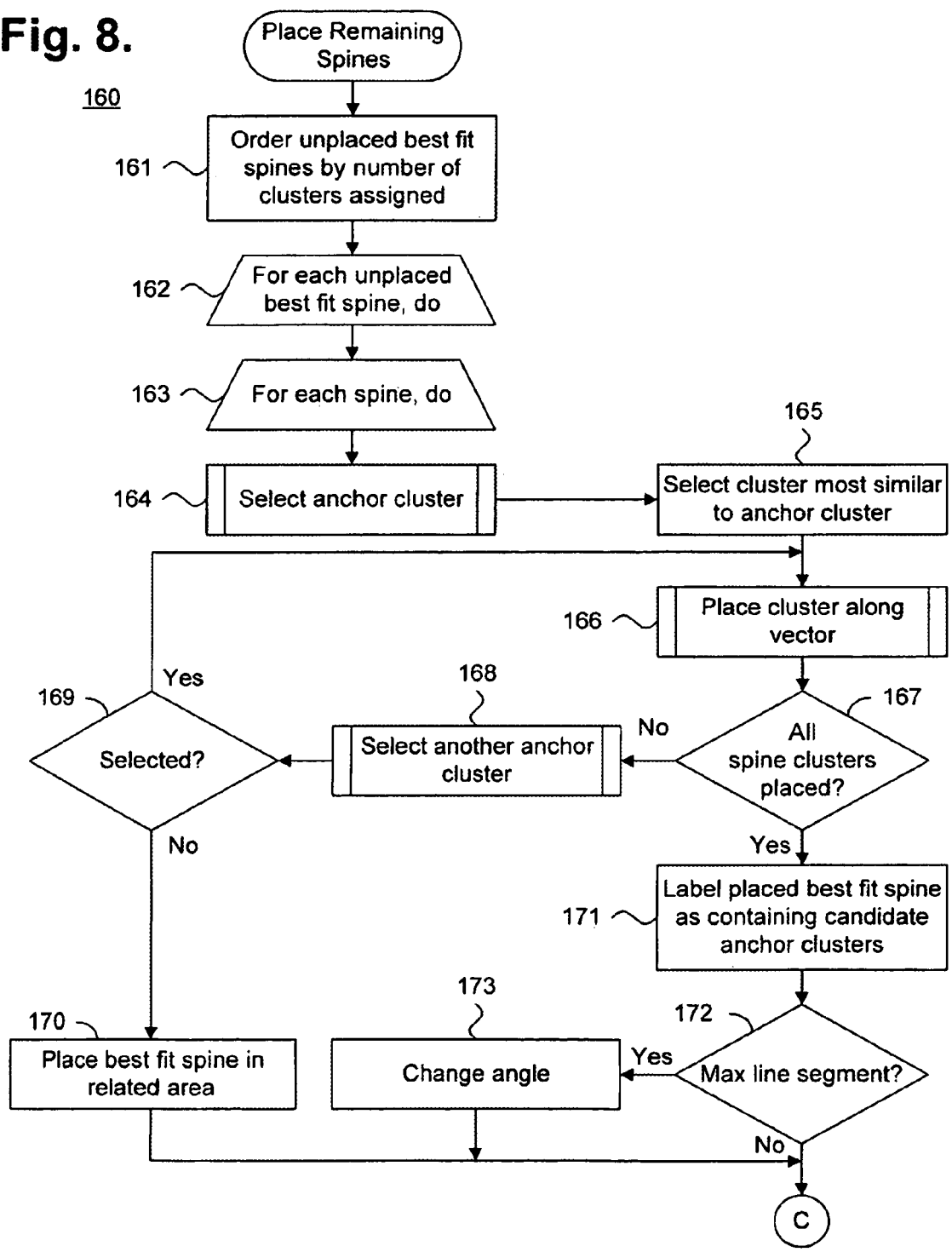
FIG. 8 is a flow diagram showing the routine for placing remaining best fit spines for use in the method of FIG. 3.
Figure 8:
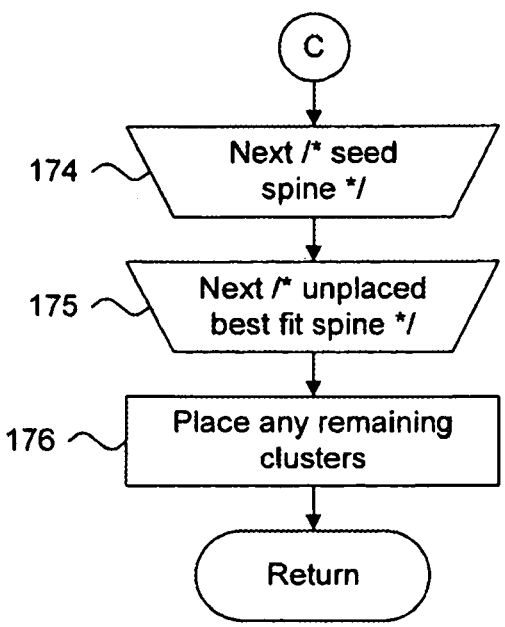

FIG. 8 is a flow diagram showing the routine 160 for placing remaining candidate spines 55 for use in the method 100 of FIG. 3. One purpose of this routine identify and place any remaining unplaced best fit spines 56 and clusters 50 that lack best fit spines 56 into the visualization 43.

First, any remaining unplaced best fit spines 56 are ordered by number of clusters 50 assigned (block 161). The unplaced best fit spine 56 are iteratively processed (blocks 162–175) against each of the previously-placed spines (blocks 163–174). During each iteration, an anchor cluster 60 is selected from the previously placed spine 58 (block 164), as further described below with reference to FIG. 9. The cluster 50 contained in the best fit spine 56 that is most similar to the selected anchor cluster 60 is then selected (block 165). In the described embodiment, cluster similarity is calculated as cosine value of the cumulative cluster concept vectors 51, although other determinations of cluster similarity are possible, including minimum, maximum, and median similarity bounds. The spine clusters 50 are grafted onto the previously placed spine along a vector defined from the center of the anchor cluster 55 (block 166), as further described below with reference to FIG. 12. If any of the spine clusters are not placed (block 167), another anchor cluster 60 is selected (block 168), as further described below with reference to FIG. 9. Assuming another anchor cluster 60 is selected (block 169), the spine clusters are again placed (block 166), as further described below with reference to FIG. 12. Otherwise, if another anchor cluster 60 is not selected (block 169), the cluster 50 is placed in a related area (block 170). In one embodiment, unanchored best fit spines 56 become additional spine group seeds. In a further embodiment, unanchored best fit spines 56 can be placed adjacent to the best fit anchor cluster 60 or in a display area of the visualization 43 separately from the placed best fit spines 56.

If the cluster 50 is placed (block 167), the best fit spine 56 is labeled as containing candidate anchor clusters 60 (block 171). If the current vector forms a maximum line segment (block 172), the angle of the vector is changed (block 173). In the described embodiment, a maximum line segment contains more than 25 clusters 50, although any other limit could also be applied. Processing continues with each seed spine (block 174) and remaining unplaced best fit spine 56 (block 175). Finally, any remaining unplaced clusters 50 are placed (block 176). In one embodiment, unplaced clusters 50 can be placed adjacent to a best fit anchor cluster 60 or in a display area of the visualization 43 separately from the placed best fit spines 56. The routine then returns.

Anchor Cluster Selection

Figure 9:
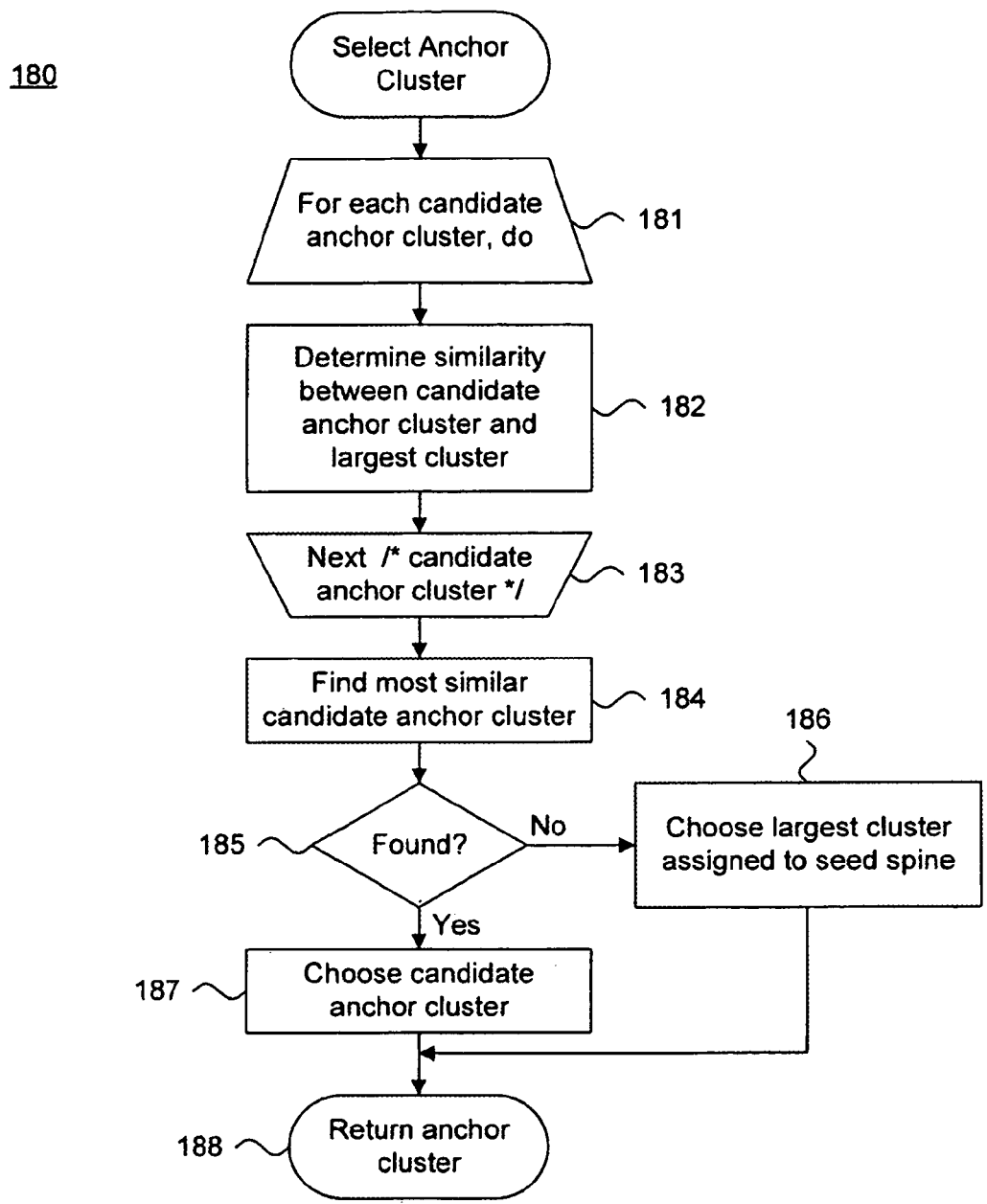
FIG. 9 is a flow diagram showing the function for selecting an anchor cluster for use in the routine of FIG. 8.

FIG. 9 is a flow diagram showing the function 180 for selecting an anchor cluster 60 for use in the routine 160 of FIG. 8. One purpose of this routine is to return a set of anchor clusters 60, which contain the spine concept and which are ordered by similarity to the largest cluster 50 in the spine.

Each candidate anchor cluster 60 is iteratively processed (blocks 181–183) to determine the similarity between a given cluster 50 and each candidate anchor cluster 60 (block 182). In one embodiment, each cluster similarity is calculated as cosine value concept vectors, although other determinations of cluster similarity are possible, including minimum, maximum, and median similarity bounds. The most similar candidate anchor cluster 60 is identified (block 184) and, if found, chosen as the anchor cluster 60 (block 187), such as described in commonly-assigned U.S. patent application Ser. No. 10/084,401, filed Feb. 25, 2002, pending, the disclosure of which is incorporated by reference. Otherwise, if not found (block 185), the largest cluster 50 assigned to the unique seed spine 58 is chosen as the anchor cluster 60 (block 186). The function then returns set of the anchor clusters 60 and the unique seed spine 58 becomes a seed for a new spine group (block 188).

Cluster Spine Example

Figure 10:
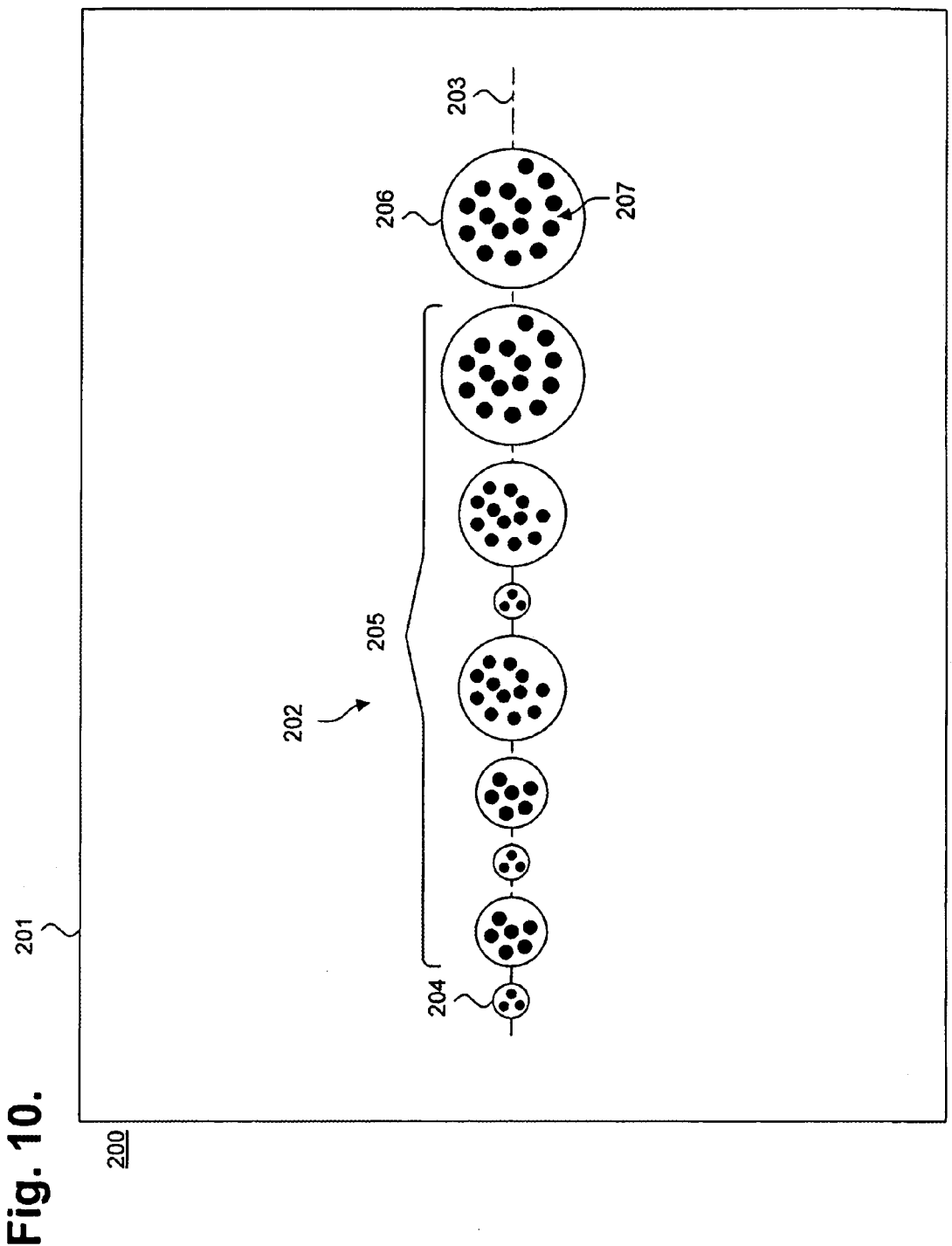
FIG. 10 is a data representation diagram showing, by way of example, a view of a cluster spine.

FIG. 10 is a data representation diagram 200 showing, by way of example, a view of a cluster spine 202. Clusters are placed in a cluster spine 202 along a vector 203, preferably defined from center of an anchor cluster. Each cluster in the cluster spine 202, such as endpoint clusters 204 and 206 and midpoint clusters 205, group documents 207 sharing a popular concept, that is, assigned to a best-fit concept 53. The cluster spine 202 is placed into a visual display area 201 to generate a two-dimensional spatial arrangement. To represent data inter-relatedness, the clusters 204–206 in each cluster spine 202 are placed along a vector 203 arranged in order of cluster similarity, although other line shapes and cluster orderings can be used.

The cluster spine 202 visually associates those clusters 204–206 sharing a common popular concept. A theme combines two or more concepts. During cluster spine creation, those clusters 204–206 having available anchor points are identified for use in grafting other cluster spines sharing popular thematically-related concepts, as further described below with reference to FIGS. 11A–C.

Anchor Points Example

Figure 11A:
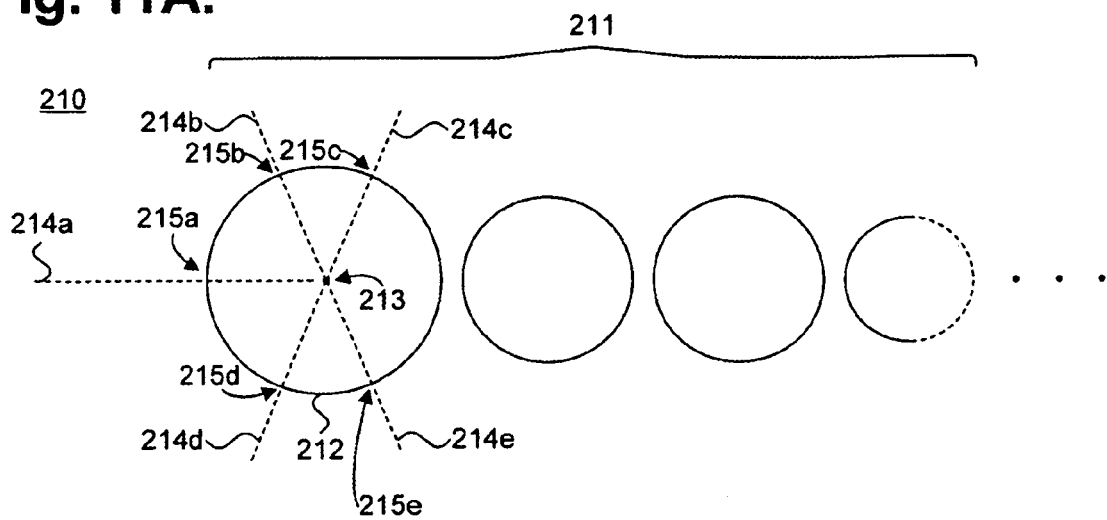
FIGS. 11A-C are data representation diagrams showing anchor points within cluster spines.
Figure 11B:
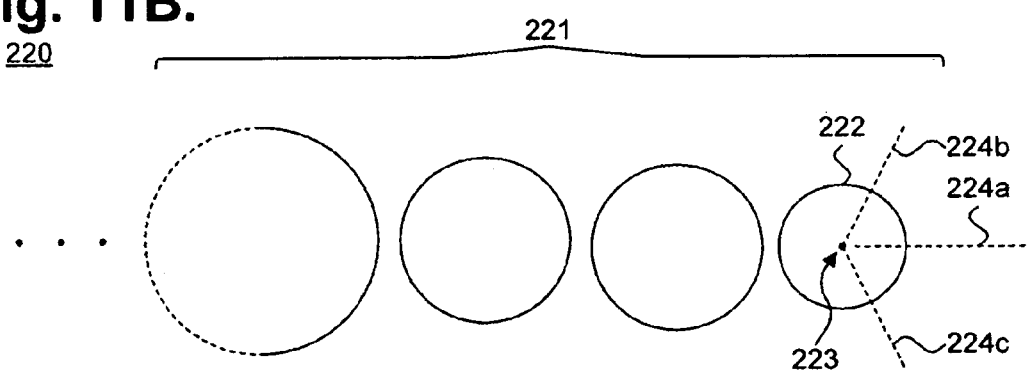
Figure 11C:
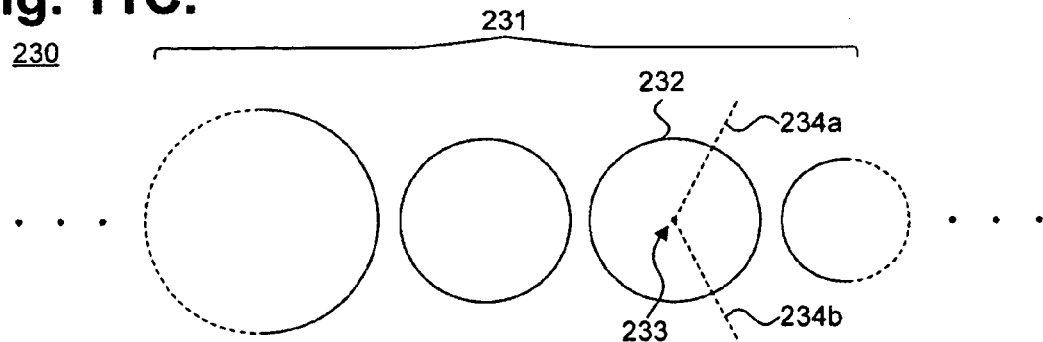

FIGS. 11A–C are data representation diagrams 210, 220, 230 showing anchor points within cluster spines. A placed cluster having at least one open edge constitutes a candidate anchor point 54. Referring first to FIG. 11A, a starting endpoint cluster 212 of a cluster spine 211 functions as an anchor point along each open edge 215a–e at primary and secondary angles.

An open edge is a point along the edge of a cluster at which another cluster can be adjacently placed. In the described embodiment, clusters are placed with a slight gap between each cluster to avoid overlapping clusters. Otherwise, a slight overlap within 10% with other clusters is allowed. An open edge is formed by projecting vectors 214a–e outward from the center 213 of the endpoint cluster 212, preferably at normalized angles. The clusters in the cluster spine 211 are arranged in order of cluster similarity.

In one embodiment, given $0 \leq \sigma < \Pi$, where $\sigma$ is the angle of the current cluster spine 211, the normalized angles for largest endpoint clusters are at one third $\Pi$ to minimize interference with other spines while maximizing the degree of interrelatedness between spines. If the cluster ordinal spine position is even, the primary angle is $$\sigma + \frac{\pi}{3}$$

and the secondary angle is $$\sigma - \frac{\pi}{3}.$$

Otherwise, the primary angle is $$\sigma - \frac{\pi}{3}$$

and the secondary angle is $$\sigma + \frac{\pi}{3}.$$

Other evenly divisible angles could be also used.

Referring next to FIG. 11B, the last endpoint cluster 222 of a cluster spine 221 also functions as an anchor point along each open edge. The endpoint cluster 222 contains the fewest number of concepts. The clusters in the cluster spine 221 are arranged in order of similarity to the last placed cluster. An open edge is formed by projecting vectors 224a–c outward from the center 223 of the endpoint cluster 222, preferably at normalized angles.

In one embodiment, given $0 \leq \sigma < \Pi$, where $\sigma$ is the angle of the current cluster spine 221, the normalized angles for smallest endpoint clusters are at one third $\Pi$, but only three open edges are available to graft other thematically-related cluster spines. If the cluster ordinal spine position is even, the primary angle is $$\sigma + \frac{\pi}{3}$$

and the secondary angle is $$\sigma - \frac{\pi}{3}.$$

Otherwise, the primary angle is $$\sigma - \frac{\pi}{3}$$

and the secondary angle is $$\sigma + \frac{\pi}{3}.$$

Other evenly divisible angles could be also used.

Referring finally to FIG. 11C, a midpoint cluster 232 of a cluster spine 231 functions as an anchor point for a separate unplaced cluster spine along each open edge. The midpoint cluster 232 is located intermediate to the clusters in the cluster spine 231 and defines an anchor point along each open edge. An open edge is formed by projecting vectors 234a–b outward from the center 233 of the midpoint cluster 232, preferably at normalized angles. Unlike endpoint clusters 212, 222 the midpoint cluster 232 can only serve as an anchor point along tangential vectors non-coincident to the vector forming the cluster spine 231. Accordingly, endpoint clusters 212, 222 include one additional open edge serving as a coincident anchor point.

In one embodiment, given $0 \leq \sigma < \Pi$, where $\sigma$ is the angle of the current cluster spine 231, the normalized angles for midpoint clusters are at one third $\Pi$, but only two open edges are available to graft other thematically-related cluster spines. Empirically, limiting the number of available open edges to those facing the direction of cluster similarity helps to maximize the interrelatedness of the overall display space.

Grafting a Spine Cluster Onto a Spine

Figure 12:
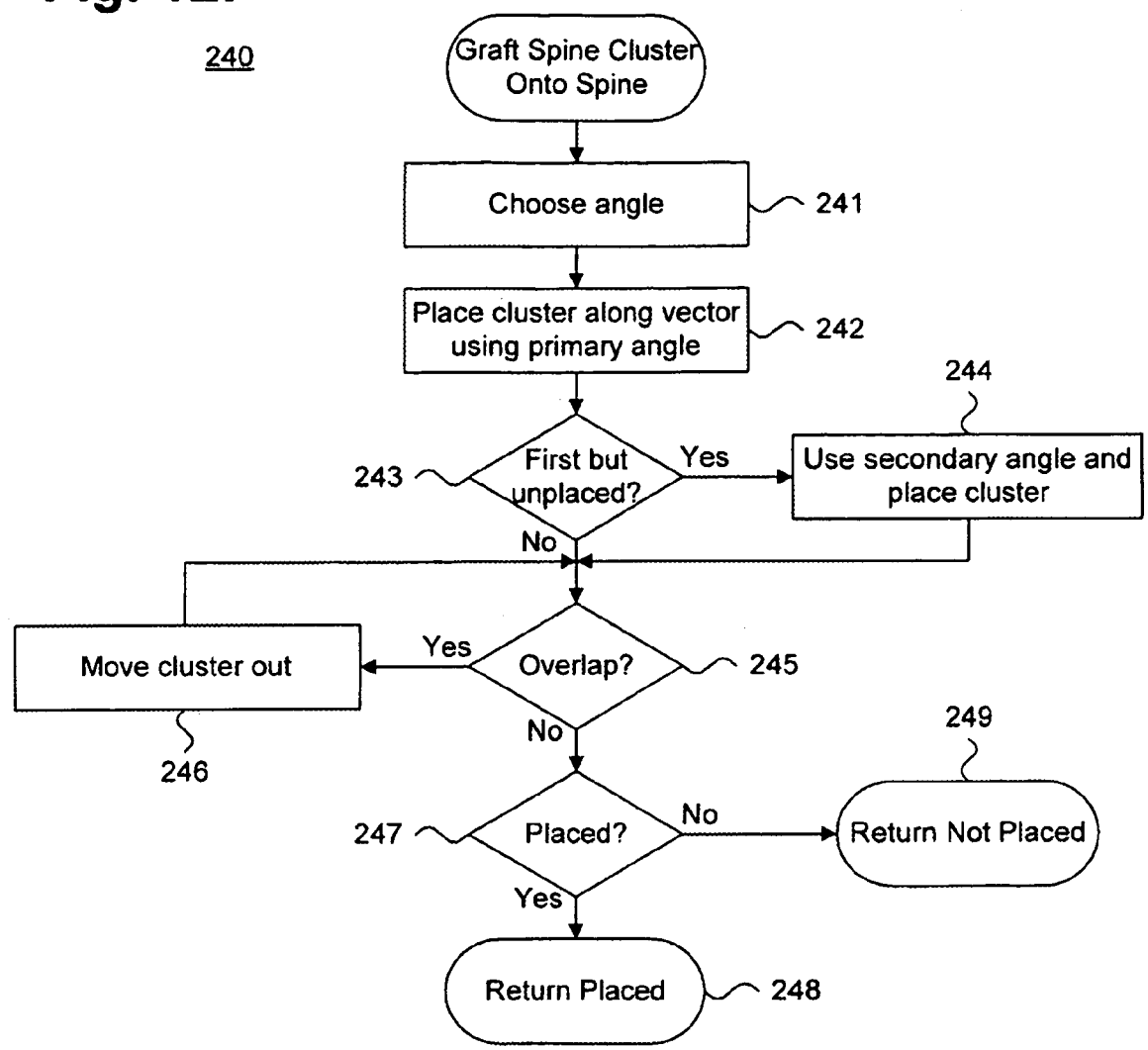
FIG. 12 is a flow diagram showing the function for grafting a spine cluster onto a spine for use in the routine of FIG. 8.

FIG. 12 is a flow diagram showing the function 240 for grafting a spine cluster 50 onto a spine for use in the routine 160 of FIG. 8. One purpose of this routine is to attempt to place a cluster 50 at an anchor point in a cluster spine either along or near an existing vector, if possible, as further described below with reference to FIG. 13.

An angle for placing the cluster 50 is determined (block 241), dependent upon whether the cluster against which the current cluster 50 is being placed is a starting endpoint, midpoint, or last endpoint cluster, as described above with reference to FIGS. 11A–C. If the cluster ordinal spine position is even, the primary angle is $$\sigma + \frac{\pi}{3}$$

and the secondary angle is $$\sigma - \frac{\pi}{3}.$$

Otherwise, the primary angle is $$\sigma - \frac{\pi}{3}$$

and the secondary angle is $$\sigma + \frac{\pi}{3}.$$

Other evenly divisible angles could be also used. The cluster 50 is then placed using the primary angle (block 242). If the cluster 50 is the first cluster in a cluster spine but cannot be placed using the primary angle (block 243), the secondary angle is used and the cluster 50 is placed (block 244). Otherwise, if the cluster 50 is placed but overlaps more than 10% with existing clusters (block 245), the cluster 50 is moved outward (block 246) by the diameter of the cluster 50. Finally, if the cluster 50 is satisfactorily placed (block 247), the function returns an indication that the cluster 50 was placed (block 248). Otherwise, the function returns an indication that the cluster was not placed (block 249).

Cluster Placement Relative to an Anchor Point Example

FIG. 13 is a data representation diagram showing cluster placement relative to an anchor point. Anchor points 266, 267 are formed along an open edge at the intersection of a vector 263*a*, 263*b*, respectively, drawn from the center 262 of the cluster 261. The vectors are preferably drawn at a normalized angle, such as $$\frac{\pi}{3}$$

in one embodiment, relative to the vector 268 forming the cluster spine 268.

Completed Cluster Placement Example,

FIG. 14 is a data representation diagram 270 showing a completed cluster placement. The clusters 272, 274, 276, 278 placed in each of the cluster spines 271, 273, 275, 277 are respectively matched to popular concepts, that is, best-fit concepts 53. Slight overlap 279 between grafted clusters is allowed. In one embodiment, no more than 10% of a cluster can be covered by overlap. The singleton clusters 280, however, do not thematically relate to the placed clusters 272, 274, 276, 278 in cluster spines 271, 273, 275, 277 and are therefore grouped as individual clusters in non-relational placements.

While the invention has been particularly shown and described as referenced to the embodiments thereof, those skilled in the art will understand that the foregoing and other changes in form and detail may be made therein without departing from the spirit and scope of the invention.

What is claimed is:

1. A system for arranging concept clusters in thematic neighborhood relationships in a two-dimensional visual display space, comprising:
    a set of clusters selected from a concept space comprising a multiplicity of clusters with concepts visualizing document content based on extracted concepts;
    a theme generator to identify a theme in each of a plurality of the clusters, each theme comprising at least one such concept ranked within the cluster; and
    a spine placer, comprising:
        a candidate spine selector to logically form a plurality of unique candidate spines comprising clusters commonly sharing at least one such concept;
        a candidate spine assigner to assign one or more of the clusters to one such candidate spine having a substantially best fit;
        a best fit candidate spine placer to identify each of the best fit candidate spines that are sufficiently unique from each other of the best fit candidate spines and to place each the-identified best fit candidate spine that was identified as sufficiently unique in a visual display space; and
        a remaining candidate spine placer to place each of the best fit candidate spines that were not identified as sufficiently unique in the visual display space next to an anchor cluster on the best fit candidate spine that is most similar and which was already placed in the visual display space.

2. A system according to claim 1, further comprising: a concept scorer to determine a cumulative score for one or more of the concepts for each of the plurality of clusters; and
    a concept ranker to rank the concepts by the cumulative score in at least one of descending and ascending order.

3. A system according to claim 1, further comprising:
    a concept evaluator to evaluate each of the plurality of concepts against an acceptance criteria to qualify as the theme of the cluster.

4. A system according to claim 3, wherein the acceptance criteria comprises at least one of being contained in a seed theme of a cluster and being contained in a predetermined minimum of the documents.

5. A system according to claim 1, further comprising:
    a candidate spine evaluator to evaluate each of the candidate spines against an acceptance criteria.

6. A system according to claim 5, wherein the acceptance criteria comprises the at least one such concept being contained in at least one of the plurality of clusters and within a predetermined maximum of the plurality of clusters.

7. A system according to claim 1, further comprising:
    a spine fit evaluator to determine a spine fit between the concept in each of the clusters and the at least one theme commonly shared by the clusters in each of the candidate spines; and
    a spine fit selector to select the spine fit comprising a maximum spine fit as the substantially best fit.

8. A system according to claim 7, wherein the spine fit is calculated in accordance to an equation:

$$F = \log\left(\frac{popularity}{rank^2}\right) \times scale$$

where popularity is defined as a number of clusters containing each such concept in the candidate spine, rank is defined as a rank of the candidate spine concept, and scale is defined as a bias factor.

9. A system according to claim 1, wherein each such best fit candidate spine containing only one such cluster is discarded.

10. A system according to claim 1, further comprising:
    a spine concept score vector generated for each of the best fit candidate spines; and
    a similarity evaluator to evaluate a similarity between the best fit candidate spine and each other of the best fit candidate spines.

11. A system according to claim 10, further comprising:
    a concept score aggregator to aggregate a concept score for each of the concepts contained in each cluster in the best fit candidate spine; and
    a concept score normalizer to normalize each aggregated concept score.

12. A system according to claim 10, wherein the similarity is calculated as a cosine over the spine concept score vectors.

13. A system according to claim 1, further comprising:
    a similarity identifier to determine a similarity between at least one anchor cluster candidate in each of the best fit candidate spines already placed in the visual display space and each of the clusters in a best fit candidate spine that was not identified as sufficiently unique, and to identify anchor cluster candidate having acceptable similarity to the clusters in the best fit candidate spine that was not identified as sufficiently unique.

14. A system according to claim 13, wherein the similarity is calculated as a cosine over the anchor cluster candidate and each of the clusters in the best fit candidate spine that was not identified as sufficiently unique.

15. A system according to claim 13, wherein the best fit candidate spine that was not identified as sufficiently unique is placed in the visual display space along a vector originating from the anchor cluster.

16. A system according to claim 15, wherein the placement of the best fit candidate spine that was not identified as sufficiently unique is adjusted if overlapping with at least one other cluster already placed in the visual display space.

17. A system according to claim 15, wherein the best fit candidate spine that was not identified as sufficiently unique is labeled as containing at least one anchor cluster candidate following placement in the visual display space.

18. A system according to claim 15, wherein the best fit candidate spine that was not identified as sufficiently unique is placed along a vector originating from the anchor cluster with an angle comprising at least one of $$\sigma \pm \frac{\pi}{3},$$

where $0 \leq \sigma < \Pi$.

19. A method for arranging concept clusters in thematic neighborhood relationships in a two-dimensional visual display space, comprising:
    selecting a set of clusters from a concept space comprising a multiplicity of clusters with concepts visualizing document content based on extracted concepts;
    identifying a theme in each of a plurality of the clusters, each theme comprising at least one such concept ranked within the cluster;
    logically forming a plurality of unique candidate spines comprising clusters commonly sharing at least one such concept and assigning one or more of the clusters to one such candidate spine having a substantially best fit;
    identifying each of the best fit candidate spines that are sufficiently unique from each other of the best fit candidate spines and placing each best fit candidate spine that was identified as sufficiently unique in a visual display space; and
    placing each of the best fit candidate spines that were not identified as sufficiently unique in the visual display space next to an anchor cluster on the best fit candidate spine that is most similar and which was already placed in the visual display space.

20. A method according to claim 19, further comprising:
    determining a cumulative score for one or more of the concepts for each of the plurality of clusters; and
    ranking the concepts by the cumulative score in at least one of descending and ascending order.

21. A method according to claim 19, further comprising:
    evaluating each of the plurality of concepts against an acceptance criteria to qualify as the theme of the cluster.

22. A method according to claim 21, wherein the acceptance criteria comprises at least one of being contained in a seed theme of a cluster and being contained in a predetermined minimum of the documents.

23. A method according to claim 19, further comprising: evaluating each of the candidate spines against an acceptance criteria.

24. A method according to claim 23, wherein the acceptance criteria comprises the at least one such concept being contained in at least one of the plurality of clusters and within a predetermined maximum of the plurality of clusters.

25. A method according to claim 19, further comprising:
    determining a spine fit between the concept in each of the clusters and the at least one theme commonly shared by the clusters in each of the candidate spines; and
    selecting the spine fit comprising a maximum spine fit as the substantially best fit.

26. A method according to claim 25, wherein the spine fit is calculated in accordance to an equation:

$$F = \log\left(\frac{popularity}{rank^2}\right) \times scale$$

where popularly is defined as a number of clusters containing each such concept in the candidate spine, rank is defined as a rank of the candidate spine concept, and scale is defined as a bias factor.

27. A method according to claim 19, further comprising:
    discarding each such best fit candidate spine containing only one such cluster.

28. A method according to claim 19, further comprising:
    generating a spine concept score vector for each of the best fit candidate spines; and
    evaluating a similarity between the best fit candidate spine and each other of the best fit candidate spines.

29. A method according to claim 28, further comprising:
    aggregating a concept score for each of the concepts contained in each cluster in the best fit candidate spine; and
    normalizing each aggregated concept score.

30. A method according to claim 28, further comprising:
    calculating the similarity as a cosine over the spine concept score vectors.

31. A method according to claim 19, further comprising:
    determining a similarity between at least one anchor cluster candidate in each of the best fit candidate spines already placed in the visual display space and each of the clusters in a best fit candidate spine that was not identified as sufficiently unique; and
    identifying the anchor cluster candidate having acceptable similarity to the clusters in the best fit candidate spine that was not identified as sufficiently unique.

32. A method according to claim 31, further comprising:
    calculating the similarity as a cosine over the anchor cluster candidate and each of the clusters in the best fit candidate spine that was not identified as sufficiently unique.

33. A method according to claim 31, further comprising:
    placing the best fit candidate spine that was not identified as sufficiently unique in the visual display space along a vector originating from the anchor cluster.

34. A method according to claim 33, further comprising:
    adjusting placement of the best fit candidate spine that was not identified as sufficiently unique if overlapping with at least one other cluster already placed in the visual display space.

35. A method according to claim 33, further comprising:
    labeling the best fit candidate spine that was not identified as sufficiently unique as containing at least one anchor cluster candidate following placement in the visual display space.

36. A method according to claim 33, further comprising:
placing the best fit candidate spine that was not identified as sufficiently unique along a vector originating from the anchor cluster with an angle comprising at least one of $$\sigma \pm \frac{\pi}{3},$$

where $0 \leq \sigma < \Pi$.

37. A computer-readable storage medium holding code for performing the method according to claim 19.

38. An apparatus for arranging concept clusters in thematic neighborhood relationships in a two-dimensional visual display space, comprising:

means for selecting a set of clusters from a concept space comprising a multiplicity of clusters with concepts visualizing document content based on extracted concepts;

means for identifying a theme in each of a plurality of the clusters, each theme comprising at least one such concept ranked within the cluster;

means for logically forming a plurality of unique candidate spines comprising clusters commonly sharing at least one such concept and means for assigning one or more of the clusters to one such candidate spine having a substantially best fit;

means for identifying each of the best fit candidate spines that are sufficiently unique from each other of the best fit candidate spines and means for placing each best fit candidate spine that was identified as sufficiently unique in a visual display space; and means for placing each of the best fit candidate spines that were not identified as sufficiently unique in the visual display space next to an anchor cluster on the best fit candidate spine that is most similar and which was already placed in the visual display space.

* * * * *

UNITED STATES PATENT AND TRADEMARK OFFICE
CERTIFICATE OF CORRECTION

PATENT NO. : 7,191,175 B2
APPLICATION NO. : 10/778416
DATED : March 13, 2007
INVENTOR(S) : Lynne Marie Evans It is certified that error appears in the above-identified patent and that said Letters Patent is hereby corrected as shown below:

Column 13,
Line 59, "to place each the-identified best fit candidate spine" should read -- to place each best fit candidate spine --.

Column 14,
Line 37, "where popularity is defined as a number of clusters contain-" should read -- where *popularity* is defined as a number of clusters contain- --;
Line 38, "ing each such concept in the candidate spine, rank is defined" should read -- ing each such concept in the candidate spine, *rank* is defined --.

Column 16,
Line 19, "where popularly is defined as a number of clusters con-" should read -- where *popularity* is defined as a number of clusters con- --;
Line 20, "taining each such concept in the candidate spine, rank" should read -- taining each such concept in the candidate spine, *rank* --;
Line 22, "scale is defined as a bias factor" should read -- *scale* is defined as a bias factor --.

Signed and Sealed this

Eleventh Day of September, 2007

JON W. DUDAS
*Director of the United States Patent and Trademark Office*